United States Patent [19]

Busdiecker et al.

[11] 4,064,913

[45] Dec. 27, 1977

[54] FLEXIBLE REINFORCED HOSE AND METHOD OF MAKING THE SAME

[75] Inventors: Wayne Scott Busdiecker, Stow; Harold Henry Seymour, North Canton, both of Ohio

[73] Assignee: Parker-Hannifin Corporation, Cleveland, Ohio

[21] Appl. No.: 729,387

[22] Filed: Oct. 4, 1976

[51] Int. Cl.² .......................... F16L 11/00; C09J 5/02
[52] U.S. Cl. ................................. 138/125; 138/141; 156/308; 428/36
[58] Field of Search ................... 156/149, 172, 308; 138/123, 124, 125, 129, 130, 132, 137, 144, DIG. 1, 141; 428/36

[56] References Cited

U.S. PATENT DOCUMENTS

| | | | |
|---|---|---|---|
| 2,977,839 | 4/1961 | Koch | 156/149 |
| 3,251,381 | 5/1966 | Koch | 138/125 |
| 3,682,201 | 8/1972 | Atwell et al. | 156/149 |
| 3,861,973 | 1/1975 | Koch | 156/149 |
| 3,881,975 | 5/1975 | Koch | 156/149 |

Primary Examiner—William R. Dixon, Jr.
Attorney, Agent, or Firm—Donnelly, Maky, Renner & Otto

[57] ABSTRACT

A flexible reinforced hose comprising nylon tubing to which a reinforcement (braid or spiral wrapping) of a synthetic or natural fiber is bonded, said tubing having an outer surface plasticized with meta-cresol to which said reinforcement is applied. Prior to application of the reinforcement excess meta-cresol is wiped off from the tubing whereby minimal residual meta-cresol remains in the completed hose. In the case of reinforcing fiber other than nylon, the bond between the reinforcing layer and the nylon tubing is essentially a mechanical bond whereas in the case of nylon reinforcing fiber, the inner surface of the reinforcement is fusion bonded to the outer surface of the tubing.

In the method of making the hose herein, nylon tubing passes through a heated meta-cresol bath with excess meta-cresol being wiped off the tubing prior to application for a reinforcement of synthetic or natural fiber on the plasticized outer surface of the tubing containing minimal residual meta-cresol.

13 Claims, 1 Drawing Figure

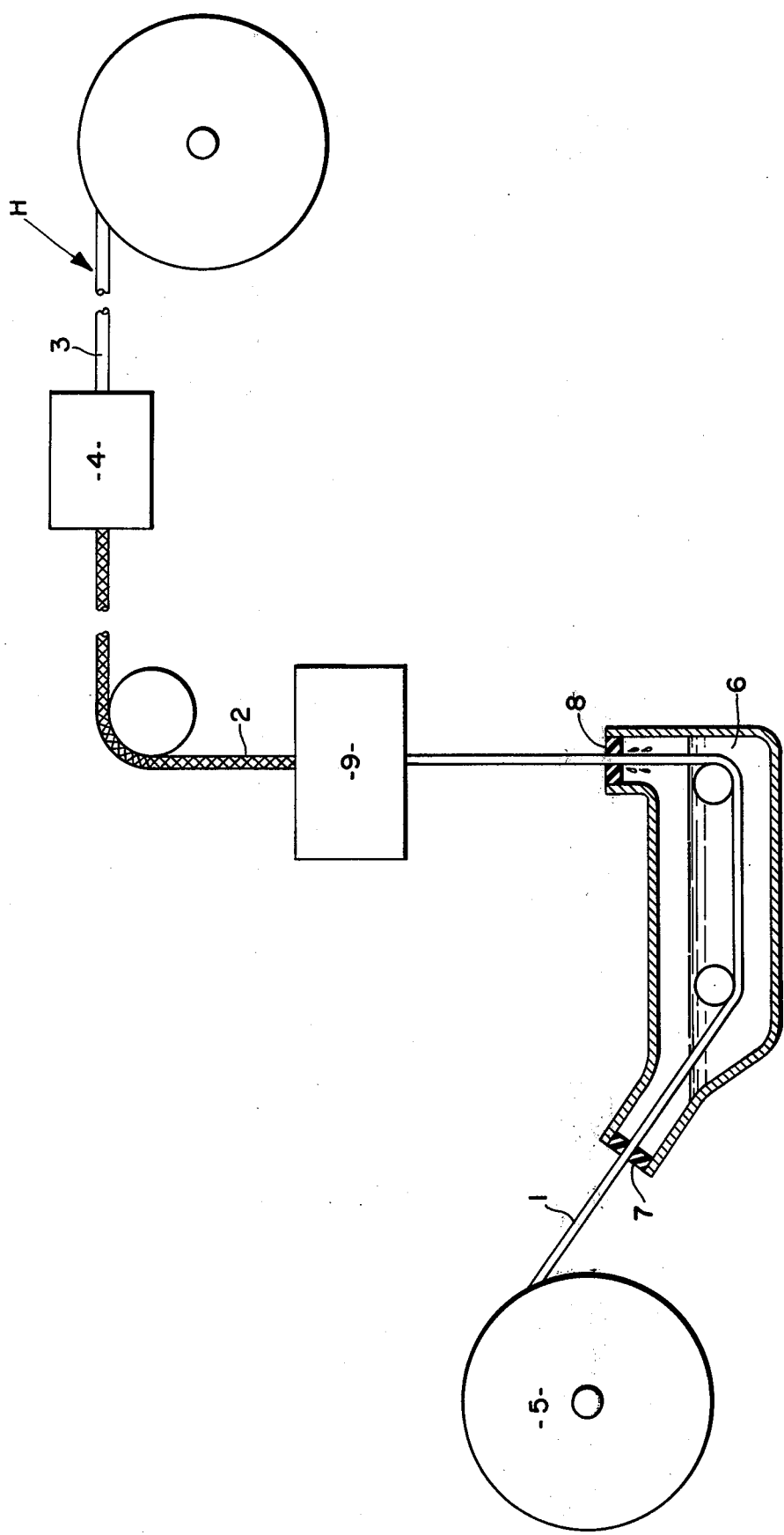

FLEXIBLE REINFORCED HOSE AND METHOD OF MAKING THE SAME

BACKGROUND OF THE INVENTION

It is known as from U.S. Pat. Nos. 2,977,839 and 3,251,381 to plasticize the surface of nylon tubing by using a resorcinol-water solution, to apply to the plasticized surface a nylon fiber reinforcement, and to cure the tubing-reinforcement assembly by passing it through a water bath to remove the plasticizing agent. The cured assembly is then heated and the reinforcement is plasticized followed by extrusion of a nylon sheath over the platicized reinforcement. Similar flexible reinforced hoses are disclosed in U.S. Pat. Nos. 3,654,967, 3,682,201 and 3,790,419.

It is also known from U.S. Pat. No. 3,861,973 to make a flexible reinforced nylon hose by contacting nylon tubing with an aqueous resorcinol solution or an alcoholic resorcinol solution, drying the solution to form crystalline material on the surface of the tubing, and applying to the tubing a layer of a synthetic or natural fiber followed by heating the reinforced tubing to a temperature of at least about 150° F.

SUMMARY OF THE INVENTION

In contradistinction to the foregoing patents, the flexible reinforced hose herein comprises nylon tubing to which a reinforcement of a synthetic or natural fiber is bonded by applying the fiber to the meta-cresol plasticized outer surface of the tubing, the excess meta-cresol having previously been wiped off the tubing, so that only the residual meta-cresol remains in the tubing-reinforcement assembly.

BRIEF DESCRIPTION OF THE DRAWING

The FIGURE of the drawing shows the present flexible reinforced hose and its method of manufacture.

DETAILED DESCRIPTION OF A PREFERRED EMBODIMENT

The flexible reinforced hose H herein comprises a nylon core tube 1 to which a reinforcement 2 (braided or spirally wrapped) of a synthetic or natural fiber is mechanically or fusion bonded by applying the reinforcement 2 to the meta-cresol plasticized surface of the core tube 1. If the core tube-reinforcement assembly is to have a plastic sheath 3 thereover, the assembly will be passed through an extruder cross head 4 for extruding sheathing material over the core tube-reinforcement assembly.

In the manufacture of the flexible reinforced hose H, the nylon core tube 1 from a supply reel 5 passes through a heated meta-cresol bath 6, the nylon core tube 1 entering the bath 6 through a rubber or rubber-like seal 7 and leaving the bath 6 through a rubber or rubber like seal and wiper 8 which wipes off excess meta-cresol from the core tube 1 so that there is a minimal residual meta-cresol content in the plasticized surface of the core tube 1. The nylon core tube 1 may be of type 6/6, type 6, type 11, or type 6/6-6 copolymer or any other nylon having the desired physical properties that are desired in the flexible hose H.

The meta-cresol bath 6 comprises at least 50% meta-cresol with the balance being composed of cresol, para-cresol, or other phenols. The preferred meta-cresol bath 6 comprises 95% meta-cresol with the balance being cresol or some other phenols. Satisfactory results have been obtained with technical grade of meta-cresol comprising 54% meta-cresol, 29% para-cresol and the balance other phenols.

The temperature of the meta-cresol bath 6 should be maintained between about 90° to 170° F, the solvation of the nylon core tube 1 being hastened by the application of heat and, of course, the heating of the bath 6 decreases the viscosity of the meta-cresol bath 6 to thereby provide a bath with greater wetting power. The heating of the meta-cresol bath 6 and consequent decreased viscosity facilitates wiping of all excess meta-cresol from the core tube 1. The removal of all excess meta-cresol from the core tube eliminates the possibility of hose reinforcement 2 damage by solvation of the reinforcement 2. The sealing of the meta-cresol bath 6 by seals 7 and 8 as aforesaid and the removal of the excess meta-cresol by seal and wiper 8 minimizes hazards associated with inhalation of toxic fumes. It has been found that an exposure of the nylon core tube 1 to the meta-cresol bath 6 for about one minute followed by wiping off all excess meta-cresol by the seal and wiper 8 provides a very thin plasticized layer on the core tube 1. While the surface of the core tube 1 is still plasticized, the core tube 1 passes through apparatus 9 which applies the reinforcement 2 in the form of a braid or spiral wrapping thus to bond the reinforcement 2 to the core tube 1. The reinforcement 2 may be a nylon, polyester, aramid, rayon, cotton or other synthetic or natural fiber. When nylon fiber is the reinforcement 2, type 6/6 nylon is preferred. When the reinforcement 2 is of nylon, the innermost surface of the reinforcement 2 will be fusion bonded to the nylon core tube whereas in the case of other reinforcements 2 the bond will be a mechanical bond between the plasticized outer surfce of the core tube 1 and the inner surface of the reinforcement 2. In any case, there will not be solvation of the reinforcement 2 sufficient to cause weakening thereof.

When the nylon core tube 1 is of type 11, the temperature of the meta-cresol bath 6 should be maintained between 120° F and 170° F.

When the tube-reinforcement assembly is to have a sheath 3 thereover it is preferred that it be of nylon but any other plastic material may be employed such as polyurethane and in that case a polyurethane adhesive may be applied on the reinforcement 2 to provide an adhesive bond when the assembly is passed through the extruder cross-head 4.

The embodiments of the invention in which an exclusive property or privilege is claimed are defined as follows:

1. The method of making a flexible reinforced hose comprising passing nylon tubing through a heated meta-cresol bath effective to plasticize the outer surface of the tubing; wiping off excess meta-cresol from the tubing as it emerges from the bath; and applying a reinforcement of a synthetic or natural fiber to the wiped plasticized surface of the tubing thus to bond the inner surface of the reinforcement to the tubing.

2. The method of claim 1 wherein a sheath of plastic material is extruded over the tubing-reinforcement assembly.

3. The method of claim 1 wherein said meta-cresol bath comprises at least 50% meta-cresol with the balance being cresol or other phenols.

4. The method of claim 1 wherein said meta-cresol bath comprises about 95% meta-cresol with the balance being cresol or other phenols.

5. The method of claim 1 wherein said meta-cresol bath comprises technical grade meta-cresol with 54% meta-cresol, 29% para-cresol, and 17% other phenols.

6. The method of claim 1 wherein said meta-cresol bath is heated to a temperature from about 90° F. to about 170° F.

7. The method of claim 1 wherein said meta-cresol bath is heated to a temperature of from about 120° F. to about 170° F. when said tubing is of Type 11.

8. A flexible reinforced hose comprising a nylon core tube having an outer surface plasticized by immersion in a heated meta-cresol bath and wiped to remove excess meta-cresol; and a reinforcement of a synthetic or natural fiber bonded to the plasticized and wiped surface of said core tube.

9. The flexible hose of claim 8 wherein said reinforcement is of material to achieve fusion bonding at the tubing-reinforcement interface.

10. The flexible hose of claim 8 wherein said reinforcement is of nylon to achieve fusion bonding at the tubing-reinforcement interface without weakening solvation of said reinforcement.

11. The flexible hose of claim 8 wherein said tubing-reinforcement assembly has an extruded plastic sheath thereover.

12. The flexible hose of claim 8 wherein said tubing-reinforcement assembly has an extruded plastic sheath adhesively bonded thereover.

13. The flexible hoase of claim 8 wherein said tubing-reinforcement assembly has an extruded nylon sheath thereover.

* * * * *